(12) United States Patent
Bertolini et al.

(10) Patent No.: US 12,540,644 B2
(45) Date of Patent: Feb. 3, 2026

(54) BEARING UNIT OF THIN SECTION

(71) Applicant: Aktiebolaget SKF, Gothenburg (SE)

(72) Inventors: Andrea A. Bertolini, Carrara (IT); Fausto Baracca, Massa (IT); Riccardo Restivo, Turin (IT)

(73) Assignee: Aktiebolaget SKF, Gothenburg (SE)

( * ) Notice: Subject to any disclaimer, the term of this patent is extended or adjusted under 35 U.S.C. 154(b) by 29 days.

(21) Appl. No.: 18/746,246

(22) Filed: Jun. 18, 2024

(65) Prior Publication Data

US 2024/0426342 A1 Dec. 26, 2024

(30) Foreign Application Priority Data

Jun. 26, 2023 (IT) .................. 102023000013119

(51) Int. Cl.
| | | |
|---|---|---|
| *F16C 19/06* | (2006.01) | |
| *F16C 33/78* | (2006.01) | |
| *F16C 33/80* | (2006.01) | |

(52) U.S. Cl.
CPC .............. *F16C 33/80* (2013.01); *F16C 19/06* (2013.01); *F16C 33/7823* (2013.01); *F16C 33/7826* (2013.01); *F16C 33/7853* (2013.01)

(58) Field of Classification Search
CPC .. F16C 19/06; F16C 33/7823; F16C 33/7826; F16C 33/7856; F16C 33/80; F16C 33/805
See application file for complete search history.

(56) References Cited

U.S. PATENT DOCUMENTS

| | | | | |
|---|---|---|---|---|
| 2022/0025931 A1* | 1/2022 | Lee | ............... | F16C 33/7823 |
| 2023/0137648 A1* | 5/2023 | Kawaguchi | .......... | F16C 33/7883 |
| | | | | 384/478 |

FOREIGN PATENT DOCUMENTS

| | | | |
|---|---|---|---|
| CN | 203348338 U | 12/2013 | |
| EP | 1464856 A1 | 10/2004 | |
| IT | 201900011646 A1 | 1/2021 | |
| JP | S52106751 U | 8/1977 | |
| JP | S5967624 U | 5/1984 | |
| JP | 2002372060 A | 12/2002 | |
| WO | WO-2020166686 A1 * | 8/2020 | ........... F16C 33/7823 |

OTHER PUBLICATIONS

Examination Report of the National Intellectual Property Office of Italy in Application No. 102023000013119, dated Feb. 28, 2024; 10pgs.

* cited by examiner

*Primary Examiner* — Phillip A Johnson
(74) *Attorney, Agent, or Firm* — Stinson LLP

(57) ABSTRACT

A bearing unit (10) having an inner ring (20) including, for each side (L) of the bearing unit (10), a shaped groove (23). The bearing unit has an outer ring (30) defining a cylindrical gap (11) with the inner ring. A plurality of rolling elements (40) are disposed inside the gap. A sealing device (50) is mounted on both of the sides of the bearing unit to protect the gap from contaminants and pollutants, and to prevent lubricant inside the gap from leaking out. The sealing device having, for each side, two sealing lips (54) (55) disposed inside the groove, a flexible support arm (56) for the two sealing lips, and an intrinsic control element (100) to control the bending of the arm to control flexibility of the arm and a friction force that a contacting sealing lip (54) exerts on the inner ring.

6 Claims, 2 Drawing Sheets

BEARING UNIT OF THIN SECTION

CROSS-REFERENCE TO RELATED APPLICATIONS

This application claims priority to Italian Application No. 102023000013119, filed Jun. 26, 2023, the entirety of which is hereby incorporated by reference.

FIELD

The present disclosure relates to a bearing unit of thin section.

BACKGROUND

Known bearing units of thin section have relatively large respective diameters and reduced axial thicknesses, and are designed to reduce weight, size and friction, to increase structural flexibility and to ensure high rotational precision. These bearing units have to meet specific demanding requirements, and are often used in aerospace applications, medical systems, robotics, astronomical instruments and machine tools, as well as in motor-racing engine design and agriculture. The efficiency of their design can lead to significant savings in terms of space, weight and cost, and requires the application of particularly sophisticated technical solutions to guarantee consistently high performance.

Such bearing units have a central axis of rotation and comprise:
- an inner ring that is delimited axially by respective annular surfaces transverse to the axis A, and is further delimited radially on the outside by an outer raceway,
- an outer ring delimited radially on the inside by an inner cylindrical surface and defining a cylindrical gap with the inner ring, and
- a plurality of rolling elements disposed inside the gap and interposed between the inner ring and the outer ring to enable the relative rotation thereof about the axis.

The known bearing units of thin section described above must be usable in applications where pollutants and contaminants could damage the bearing units themselves and get into the gap, significantly reducing not only performance but also service life. In order to protect the gap, i.e. the rolling bodies and the lubricating grease therein, known bearing units, for example the bearing unit described in Italian patent application 102019000011646 filed by the same applicant, comprise two sealing shields disposed on axially opposite sides of the bearing unit and interposed between the inner and outer rings, both to prevent contaminants and pollutants from entering the gap and to prevent the internal lubricating grease from leaking out.

In Italian patent application 102019000011646, the inner ring, which is in this case stationary, has two annular shaped grooves formed in the annular surfaces, and the sealing shields are shaped metal shields formed by pressing, i.e. are substantially rigid, are fitted inside the inner cylindrical surface of the outer ring, and have respective free cylindrical end portions that are inserted into the relative shaped annular grooves to form respective multi-stage labyrinth seals.

Although on one hand these multi-stage labyrinth seals are particularly efficient in preventing contaminants and pollutants from entering the gap, and in preventing the internal lubricating grease from leaking out, precisely the specific "open" shape thereof allows some types of contaminants to accumulate at least at the entrances of the labyrinth seals, slowly forming sediment that over time tends to become more dense, increasing the rolling resistance of the bearing and increasingly hindering the free relative rotation of the inner ring and outer ring.

SUMMARY

The present disclosure is intended to provide a bearing unit of thin section that achieves the same performance levels in terms of rolling resistance, but with improved resistance against pollutants and contaminants, thereby increasing the service life thereof.

The present disclosure provides a bearing unit of thin section having the features set out in the attached claims.

BRIEF DESCRIPTION OF THE DRAWINGS

The present disclosure is described below with reference to the attached drawings showing a non-limiting example embodiment thereof, in which.

DETAILED DESCRIPTION

Figure 1:
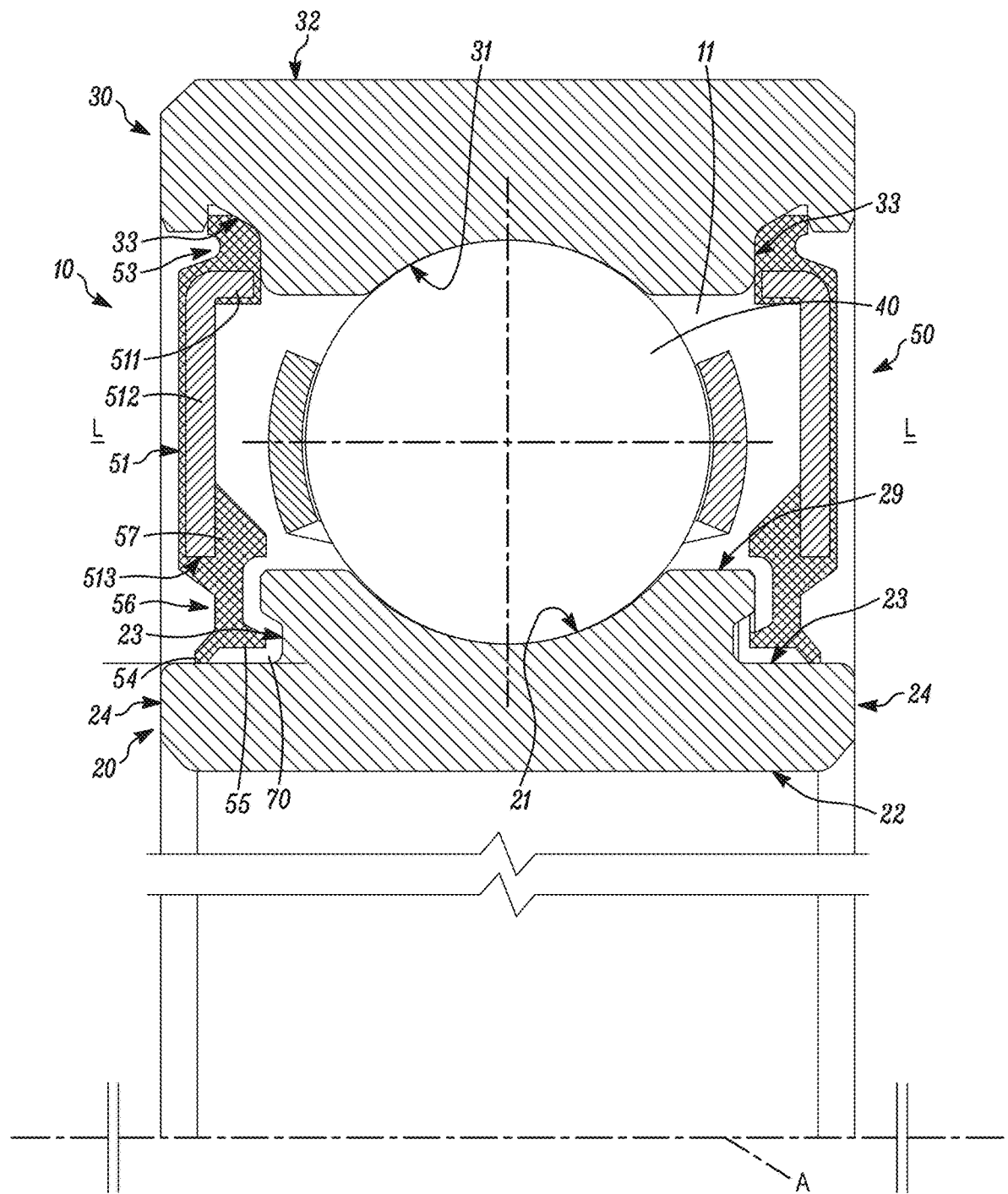
FIG. 1 is a cross-sectional view of a preferred embodiment of the bearing unit of thin section according to the present disclosure.

In FIG. 1, a bearing unit of thin section, and therefore having very limited axial dimensions and simultaneously somewhat large diameters, is indicated as a whole with reference sign 10. In particular, the present description, although generally applicable, makes explicit reference to a bearing unit 10 with a cross section, or rather a thickness of the cross section, that is extremely small and predominantly square and, as better described below, with a shaft diameter and a seat diameter that are particularly large, even between 8 and more than 11 times larger than the thickness of the cross section.

The bearing unit 10 has a central axis A of rotation and comprises:
- a rotary inner ring 20 that is provided, radially on the outside, with an outer raceway 21 and is delimited axially by respective annular surfaces 24 that are transverse to the axis A and identify respective sides L of the bearing unit 10,
- a stationary outer ring 30 that is provided, radially on the inside, with an inner raceway 31 and that defines a cylindrical gap 11 with the inner ring 20, and
- a plurality of rolling elements 40, i.e. balls, disposed inside the gap 11 between the inner ring 20 and the outer ring 30 to roll in the raceways 21 and 31 and to enable the relative rotation thereof about the axis A.

The bearing unit 10 further comprises a sealing device 50 that is mounted on both sides L of the bearing unit 10 to protect the gap 11, i.e. the rolling elements 40 and the lubricating grease in the gap 11 itself, against contaminants and pollutants, and to prevent the internal lubricating grease from leaking out.

The outer ring 30 is delimited radially on the outside by an outer cylindrical surface 32 defining the aforementioned seat diameter, and is provided with two shaped grooves 33, that are predominantly radial, i.e. that extend predominantly radially and are substantially closed axially, disposed on opposite sides of the raceway 31, whereas the inner ring 20 is radially delimited on the inside by an inner cylindrical surface 22 defining the aforementioned shaft diameter, is radially delimited on the outside by an inner cylindrical surface 29, in which the raceway 21 is formed, and is provided with two shaped grooves 23 that are predominantly axial, i.e. that extend predominantly axially and are substantially closed radially, which are disposed on opposite sides of the raceway 21, and are essentially formed through the relative surfaces 24.

Figure 2:
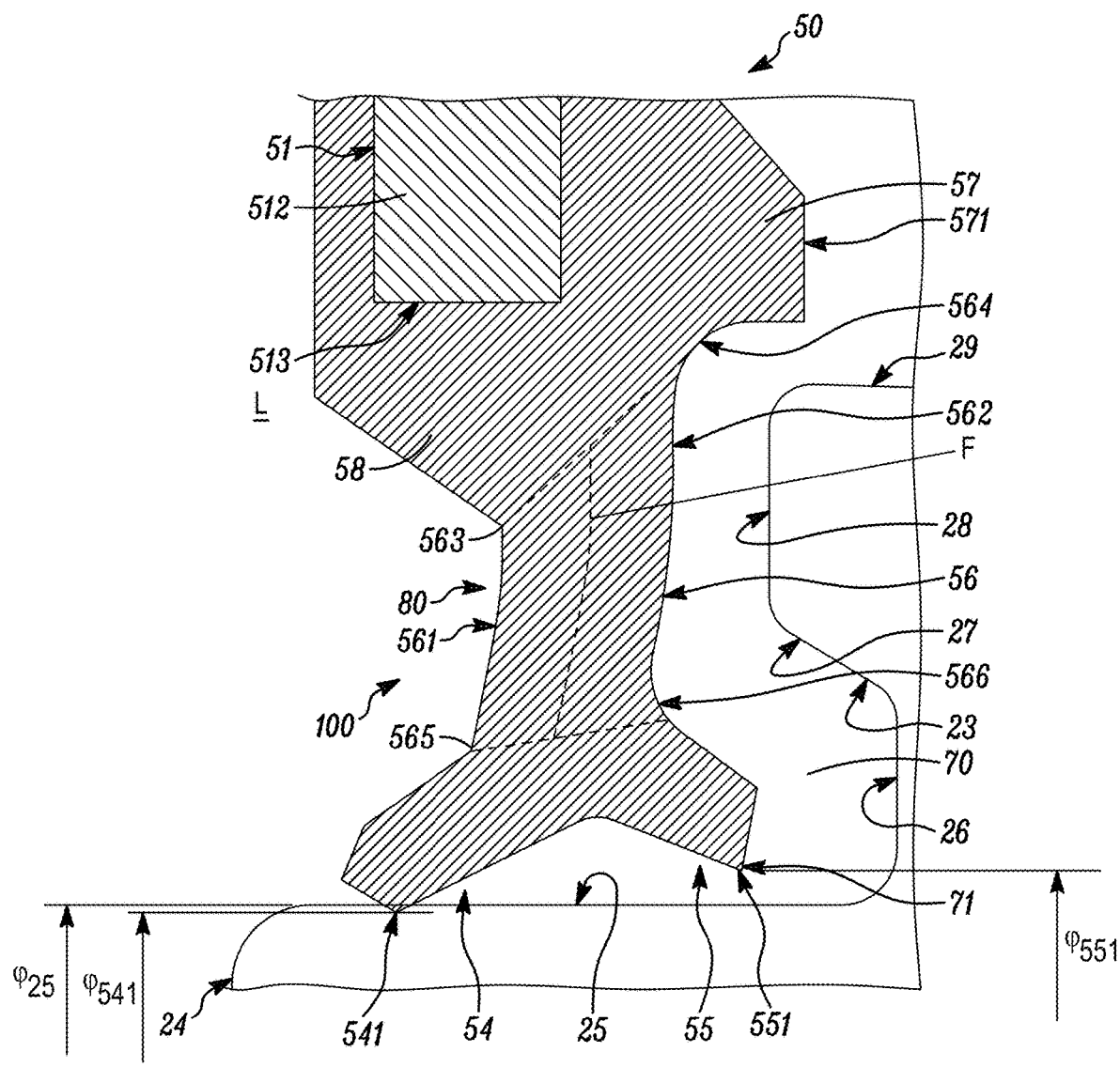
FIG. 2 is a magnified detail of the bearing unit of thin section in FIG. 1.

As shown more clearly in FIG. 2, each shaped groove 23 is delimited by:

a cylindrical surface 25 coaxial with the axis A that extends axially towards the inside of the inner ring 20 from the related surface 24 and is connected to the related surface 24 itself by a circular entry edge 251 of gradually increasing diameter towards the surface 25 from the surface 24, an annular surface 26 transverse to the cylindrical surface 25 and connected to the cylindrical surface 25 itself, a conical surface 27 that projects towards the cylindrical surface 25 and is connected to the annular surface 26, and another annular surface 28 that is connected both to the conical surface 27 and to the cylindrical surface 29, and is axially offset more towards the surface 24 than the annular surface 26.

The sealing device 50 is an anchoring sealing device, is mounted on both sides L of the bearing unit 10 and, being a substantially non-rigid device, can be deformed elastically between an operational non-deformed pre-assembly condition, as shown by way of example in FIG. 1, and an operational deformed assembly condition, as shown in detail in FIG. 2.

For each side L of the bearing unit 10, the sealing device 50 comprises a shield 51 that is preferably but not necessarily made of metal and has an inverted "L" shape in the cross section of the bearing unit 10, and an elastomer coating 52 co-moulded onto the shield 51. The shield 51 and the coating 52 on one side L are disposed as a mirror image of the shield 51 and the coating 52 on the other side L, and are practically identical to the shield 51 and to the coating 52 on the other side L. Consequently, the description below refers to a shield 51 and to a coating 52 on one side L, on the left-hand side of the bearing unit 10 in FIG. 1, and should be understood to be perfectly applicable to the shield 51 and to the coating 52 on the other side L.

The shield 51 substantially comprises a cylindrical portion 511 disposed in the groove 33 and a flanged portion 512 that extends from the portion 511 transversely to the axis A towards the inner ring 20, substantially flush with the surface 24, and terminates with a cylindrical free edge 513 that is substantially aligned in the radial direction with the surface 29, or at least does not extend radially inwards beyond the surface 29.

The shield 51 acts as a stiffening element for the elastomer coating 52, which in turn comprises:

an anchoring lip 53 integral with the cylindrical portion 511 and fitted into the groove 33 to anchor the shield 51 and the coating 52 to the outer ring 30, i.e. to anchor the sealing device 50 to the bearing unit 10, two sealing lips 54 and 55 disposed inside the groove 23 and disposed in substantially opposite directions with respect to the axis A, a flexible support arm 56 that extends radially from the free cylindrical edge 513 of the flanged portion 512 to support the two lips 54 and 55, and has a substantially intermediate central axis F, and a deflector baffle 57 that extends from the flanged portion 512 laterally to the edge 513 in a position radially outside the arm 56 and towards the gap 11, and has a respective front annular surface 571 essentially aligned axially with the surface 28.

The two sealing lips 54 and 55, the flexible arm 56 and the deflector baffle 57, together with the groove 23, i.e. with the surfaces 25, 26, 27 and 28 of the groove 23 itself, define a multi-stage labyrinth seal 70. In the operational non-deformed pre-assembly condition shown in FIG. 1, since the elastomer coating 52 would be disposed with the axis F, i.e. with the arm 56, orthogonal to the axis A, the multi-stage labyrinth seal 70 has a constant aperture from the lip 54, also in a non-deformed configuration, to the surface 571, where the labyrinth seal 70 opens into the gap 11.

According to the present disclosure, in the operational deformed assembly condition, as shown in detail in FIG. 2, the arm 56 and the axis F thereof are deformed and more specifically curved or bent, and as a result the aperture of the multi-stage labyrinth seal 70 is no longer constant.

The curving or bending of the arm 56 is determined by the specific shape of the sealing lips 54 and 55, of which the lip 54 extends from the arm 56 axially towards the outside of the bearing unit 10 and radially towards the surface 25 and has a contacting edge 541 that has an internal diameter $\varphi_{541}$ having dimensions smaller than the dimensions of an external diameter $\varphi_{25}$ of the surface 25 and that, in the operational deformed assembly condition, is disposed against the surface 25 itself, simultaneously closing the multi-stage labyrinth seal 70 and bending the arm 56. Indeed, in the operational non-deformed pre-assembly condition, the sealing lip 54 is disposed in front of the inner ring 20 with the edge 541 thereof radially inside the axial projection of the surface 25, and when the sealing device 50 is assembled in the bearing unit 10, this edge 541 intercepts the entry edge 251 and gradually converges to the same diameter (25 as the surface 25 to reach the operational deformed assembly condition, forcing the lip 54 to open gradually to fit the surface 25, but also causing the arm 56 to bend to accompany the opening of the lip 54. In other words, the sealing lip 54 of the two sealing lips 54 and 55 is a contacting sealing lip disposed against the surface 25, which is therefore a sliding surface.

Conversely, the sealing lip 55 extends from the arm 56 axially towards the inside of the bearing unit 10 and radially towards the surface 25 to be positioned in front of the surfaces 25, 26 and 27 of the groove 23, forms an inverted "V" shape with the lip 54 that opens towards the axis A, and has a free end edge 551 that has, both in the operational deformed assembly condition and in the operational non-deformed pre-assembly condition, a respective internal diameter $\varphi_{551}$ that has dimensions that are always greater than the dimensions of the internal diameter of the edge 541 and in particular of the diameter $\varphi_{25}$ of the surface 25. The sealing lip 55 has a free length having dimensions smaller than the dimensions of a free length of the lip 54 and, if the sealing lip 54 is a contacting lip, the sealing lip 55 is not able to come into contact with any of the surfaces 25, 26 and 27 of the groove 23 but, being carried by the arm 56 and following the bending of the latter, is inclined with respect to the axis A, bringing the edge 551 thereof closer to the surface 25 and resulting in a widening of the multi-stage labyrinth seal 70 with respect to the surfaces 26 and 27, as well as a narrowing 71 of the multi-stage labyrinth seal 70 with respect to the surface 25 itself.

The narrowing 71 of the multi-stage labyrinth seal 70 has a radial dimension that is always less than the difference between the dimensions of the diameter $\varphi_{551}$ and the dimensions of the diameter $\varphi_{25}$, but never equal to zero, and therefore the sealing lip 55 of the two sealing lips 54 and 55 is a non-contacting sealing lip simply disposed in front of the surface 25.

As mentioned above, the bearing unit 10 must always satisfy specific demanding requirements, and the related design always requires the use of particularly sophisticated technical solutions. Consequently, the arm 56 must have a specific shape and features to enable the curvature thereof, i.e. the bending of the axis F thereof, to be controlled with absolute precision.

In particular, according to the present disclosure, the arm 56 is anchored to the flanged portion 512 by a root portion 58 that is part of the elastomer coating 52, and has a rigidity greater than the rigidity of the arm 56 despite being formed from the same elastomeric material as the arm 56, since it is directly connected to the flanged portion 512 and furthermore has an axial thickness of dimensions greater than the dimensions of an axial thickness of the arm 56. In other words, the root portion 58 is neutral and unaffected by any bending of the arm 56, and this neutrality is further reinforced by the fact that the root portion 58 is substantially contiguous with the baffle 57.

Again with reference to FIG. 2, the arm 56 is axially delimited by two annular surfaces 561 and 562, of which the surface 561 is oriented towards the outside of the gap 11 and has a lesser radial extension than a radial extension of the surface 562, which is not only axially oriented towards the gap 11 but is also directly in front of the surface 28. The surface 561 is identified, i.e. also radially delimited, along the part of the elastomer coating 52 oriented towards the outside of the bearing unit 10, by two annular angular edges 563 and 565 that define structural discontinuities in the elastomer coating 52 itself and constrain the arm 56 to a specific rotation substantially about same, essentially acting as annular hinges. The angular edge 563 in particular defines a structural discontinuity between the arm 56 and the root portion 58 enabling a rotation of the arm 56 with respect to the root portion 58, while the angular edge 565 in particular defines a structural discontinuity between the arm 56 and the lip 54 and, enabling a rotation of the lip 54 with respect to the arm 56, mitigates the effect of the rotation of the lip 54 on the arm 56 following contact of the lip 54 with the surface 25, but whereas the edge 563 is a substantially stationary edge as it is connected structurally to the root portion 58, the edge 565 is a movable edge with respect to the edge 563 with an oscillation determined by the bending of the arm 56.

Again in order to obtain close control of the bending of the arm 56, the surface 562 is identified, along the part of the elastomer coating 52 oriented towards the inside of the bearing unit 10, by two annular arc-shaped edges 564 and 566 that define respective toroidal connection surfaces between the arm 56 and the baffle 57 and respectively between the arm 56 and the lip 55. If the two annular angular edges 563 and 565 force the arm 56 to bend substantially towards the outside of the bearing unit 10, rotating essentially about the edges 563 and 565 themselves, and substantially compressing the surface 561, the arc-shaped edges 564 and 566 tend to open, affording the arm 56 the elasticity required, conversely, to enable the surface 562 to stretch, notably always in an entirely controlled manner. The arc-shaped edge 566 furthermore facilitates the rotation of the lip 55 practically about the edge 565 under the opening stress of the lip 54.

In other words, the edges 563-566, and the surfaces 561 and 562, together define an intrinsic control element 100 to control bending of the arm 56 and the dimensioning thereof, i.e. the dimensioning of the angles subtended by the edges 563 and 565, as well as the arcs subtended by the edges 564 and 566, as well as the radial extensions of the surfaces 561 and 562, make it possible to control the flexibility of the arm 56 individually and specifically.

Furthermore, the edge 564, which is essentially also formed in the root portion 58, makes the baffle 57 even more practically neutral to the bending of the arm 56, enabling the sealing device 50 to keep a distance between the baffle 57 and the surfaces 28 and 29 unchanged, thereby ensuring permanent precise control also over the aperture of the multi-stage labyrinth seal 70 itself where the labyrinth seal 70 opens into the gap 11.

It is obvious from the foregoing that the sealing device 50 of the bearing unit 10 according to the present disclosure provides, primarily by means of the seal 54, a contacting barrier of the labyrinth seal 70 preventing contaminants and pollutants from entering the labyrinth seal 70 itself, and therefore provides, by means of the lip 55, a narrowing of the labyrinth seal 70 that not only helps to further prevent contaminants and pollutants from entering the labyrinth seal 70, i.e. towards the gap 11, but also prevents the lubricating grease from coming out of the gap 11 itself.

Furthermore, since the bending of the arm 56 is totally controlled by the novel geometry of the arm 56 itself, i.e. on account of the intrinsic control element 100, it is also possible to control with extreme precision, and again on account of the intrinsic control element 100, the total friction force that the edge 541, i.e. that the lip 54, exerts on the surface 25, thereby improving the performance of the bearing unit 10, i.e. the high precision thereof, the quietness thereof, and the high load-bearing capacity thereof. In particular, the novel geometry of the arm 56 itself enables the lip 54 to spontaneously and automatically adapt to the operating stresses of the bearing unit 10, thereby ensuring a constant efficiency of the sealing capacity of the sealing device 50, as well as minimal wear of the lip 54 itself and friction of modest intensity. Similarly, again on account of the intrinsic control element 100, it is also possible to control with extreme precision the radial dimensions of the narrowing 71 of the multi-stage labyrinth seal 70, including by adapting same to the types of lubricating grease used, and to the types of application, thereby making the range of uses of the bearing unit 10 even more flexible and wide.

Finally, it should also be highlighted that the presence of the two annular angular edges 563 and 565 creates a concave zone 80 in the elastomer coating 52 that is oriented towards the outside of the bearing unit 10 and that is able, on account of the shape thereof, to move contaminants away from the labyrinth seal 70, thereby enhancing the sealing capacity of the sealing device 50 itself. Similarly, the baffle 57, on account of the shape thereof and the cooperation thereof with the groove 23, helps to return the lubricating grease towards the inside of the gap 11, thereby preventing same from entering the labyrinth seal 70.

Finally, it should be recalled that the sealing lips 54 and 55 and the flexible support arm 56, as described above with particular reference to a cross section of the bearing unit 10, are in all cases constrained to rotate about the axis A. In particular, the lips 54 and 55 are substantially conical solids of revolution with divergent tapering, the sealing action of which is provided through 360° about the axis A, and is further emphasized by the fact that both face the surfaces 25, 26 and 27 that are rotary with the inner ring 20 about the axis A itself. The relative rotation of the surfaces 25, 26 and 27 and of the two lips 54 and 55 creates vortical motion in any element, usually a fluid element, or in any case a somewhat dense element, found inside the labyrinth seal 70. Such vortical motion, on account of the shape and reciprocal orientation of the two lips 54 and 55, tends to expel any contaminants that have accidentally entered the labyrinth seal 70, and tends to return any lubricating grease that has entered the labyrinth seal itself 70 back to the gap 11.

Numerous other variants exist in addition to the embodiments of the present disclosure described above. Said embodiments are provided solely by way of example and do not limit the scope of the present disclosure, its applications or its possible configurations. Indeed, although the description provided above enables the person skilled in the art to carry out the present disclosure at least according to one example configuration thereof, numerous variations of the components described could be used without thereby departing from the scope of the present disclosure, as defined in the attached claims interpreted literally and/or according to their legal equivalents.

What is claimed is:

1. A bearing unit of thin section having a central axis of rotation, the bearing unit comprising:
    an inner ring having an outer raceway radially on the outside, the inner ring having, axially on the outside for each side of the bearing unit, a shaped groove extending predominantly axially,
    an outer ring that defines a cylindrical gap with the inner ring and is provided, radially on the inside, with an outer raceway and, axially on the inside, for each side of the bearing unit, with a shaped groove extending predominantly radially,
    a plurality of rolling elements disposed inside the gap and interposed between the inner ring and the outer ring to enable the relative rotation thereof about the axis, and
    a sealing device that is mounted on both sides of the bearing unit to protect the gap from contaminants and pollutants, and to prevent the lubricating grease inside the gap from leaking out, is anchored to the outer ring and defines a multi-stage labyrinth seal, with the shaped groove for each side of the bearing unit, the sealing device including, for each side of the bearing unit:
    two sealing lips disposed inside the groove,
    a flexible support arm for the two sealing lips, and
    intrinsic control means to control the bending of the arm to individually and specifically control both the flexibility of the arm and a friction force that a contacting sealing lip of the two sealing lips exerts on the inner ring.

2. The bearing unit according to claim 1, wherein the contacting sealing lip closes the multi-stage labyrinth seal, substantially preventing the ingress of the contaminants and pollutants.

3. The bearing unit according to claim 2, wherein a non-contacting sealing lip of the two sealing lips defines a narrowing of the multi-stage labyrinth seal with a never-zero radial dimension, controlled by the intrinsic control means.

4. The bearing unit according to claim 3, wherein the sealing device comprises, for each side of the bearing unit, a stiffening shield supporting the flexible arm and the two sealing lips by means of an interposed rigid root portion, the intrinsic control means to control the bending of the arm comprising two structural discontinuities disposed between the rigid root portion and the flexible arm, and between the flexible arm and the contacting sealing lip, wherein a first structural discontinuity of the two structural discontinuities is a substantially static discontinuity, whereas a second structural discontinuity of the two structural discontinuities is a mobile discontinuity.

5. The bearing unit according to claim 4, wherein the intrinsic control means to control the bending of the arm further comprises two annular arc-shaped edges disposed between the rigid root portion and the flexible arm, and between the flexible arm and the non-contacting sealing lip, the annular arc-shaped edges tending to open to afford the arm the elasticity required to bend.

6. The bearing unit according to claim 5, wherein the intrinsic control means to control the bending of the arm further comprises a compressible annular surface and an extendable annular surface that delimit the flexible arm on opposite sides, the compressible annular surface connecting the two structural discontinuities to one another, and the extendable annular surface connecting the annular arc-shaped edges to one another.

* * * * *